E. W. HOUSE.
VEHICLE SIGNAL.
APPLICATION FILED AUG. 2, 1920.
1,419,854.  Patented June 13, 1922.
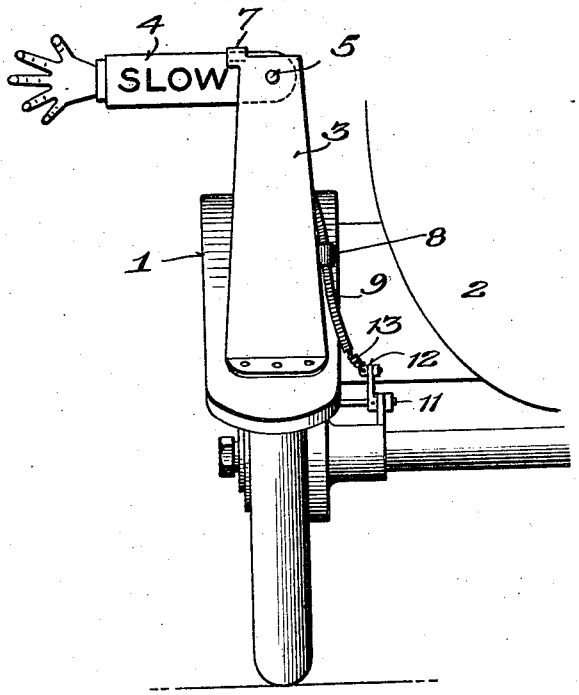
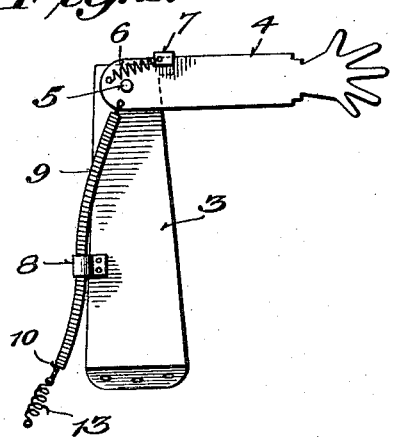
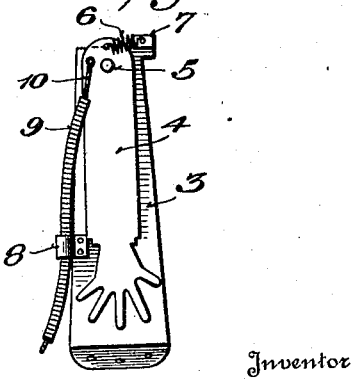
Inventor
Ernest W. House,

UNITED STATES PATENT OFFICE.

ERNEST W. HOUSE, OF BIRMINGHAM, ALABAMA.

VEHICLE SIGNAL.

1,419,854.  Specification of Letters Patent.  Patented June 13, 1922.

Application filed August 2, 1920. Serial No. 400,676.

*To all whom it may concern:*

Be it known that I, ERNEST W. HOUSE, a citizen of the United States, residing at Birmingham, in the county of Jefferson and State of Alabama, have invented new and useful Improvements in Vehicle Signals, of which the following is a specification.

Traffic regulations generally require motor vehicle operators to signal their intent when the speed of the vehicle is about to be materially reduced or checked thereby giving timely warning to the drivers of following vehicles so as to avoid a rear end collision.

The object of the present invention is to provide a simple and improved signal which may be conveniently mounted upon a vehicle, and which may be conveniently connected to the brake mechanism so as to be automatically operated under the application of the brakes. A further object of the invention is to maintain the signal element normally hidden from view, and to hold the signal member effectually in its hidden and inoperative position.

The invention furthermore consists of the novel features, details of construction and combination of parts which hereinafter will be more fully described and claimed.

Referring to the drawings:

Figure 1 is a rear fragmentary view showing an application of the invention.

Figure 2 is a view in elevation of the signal as seen from the front with the arm extended.

Figure 3 is a view similar to Figure 2 with the arm folded.

Corresponding and like parts are referred to in the following description and indicated in the several views of the drawings by like reference characters.

The signal may be located upon any convenient part of the vehicle so as to be readily observable from the rear. In the present instance the signal is illustrated as attached to the rear fender or mud guard 1 of a motor vehicle 2. The signal embodies a mount 3 which partakes of the nature of a bracket or standard. The mount 3 is provided at its lower end with a base which is apertured to receive suitable fastening means whereby it is secured to the fender or other convenient part of the vehicle. An arm 4 is pivoted at one end to the upper end of the mount 3 at 5. The free end of the arm 4 is provided with an indicator which preferably is in the form of the human hand when extended. The arm 4 when folded as indicated in Figure 3 is hidden from view by the mount 3 so that the operator of a vehicle following that provided with the signal will not observe the signalling arm under normal conditions. However, when the speed of the vehicle is reduced or checked by application of the brake the signal is set by extension of the arm 4 as indicated most clearly in Figures 1 and 2. The arm 4 will be provided with a suitable legend for conveying desired information and in the present instance the word SLOW appears on the arm and indicates caution. Normally the arm 4 occupies a pendent position so as to be hidden from view in the rear of the machine. A contractile helical spring 6 normally holds the arm 4 in pendent or folded position. This spring has one end attached to the mount 3 and its other end fastened to the arm 4. A stop 7 at the upper end of the mount 3 and near the outer vertical edge thereof extends across the path of the arm 4 to limit its movement when extended as indicated most clearly in Figures 1 and 2. A stop 8 provided on the mount 3 in line with the inner vertical edge thereof is adapted to engage the arm 4 and limit its movement when folded.

A guide tube 9 is attached to the mount 3 and a wire 10 passes therethrough. One end of the wire 10 is attached to the end of the arm 4 a short distance from the pivot support 5. The other end of the wire 10 is connected to the brake operating mechanism. The wire 10 passes through the guide tube 9. The guide tube 9 may be secured to the mount 3 in any manner and as indicated the part 8 is utilized as securing means therefore. It will thus be understood that the part 8 performs the double office of a stop and attaching means for the guide tube.

The brake operating mechanism includes a shaft 11 and an arm 12 secured to the shaft and projecting therefrom. The brake operating pedal or lever is connected to the arm 12 in any approved or well known way. The wire 10 is also connected to the arm 12. When the brake is set the arm 12 moves so as to exert a pull upon the wire 10 whereby the arm 4 is moved from a pendent or folded position into an extended or display position as indicated in Figures 1 and 2 so as to be readily observed by the driver of a following vehicle. A contractile helical spring 13 connects the wire 10 with the arm 12 and constitutes a yieldable element to admit of the brake operating mechanism continuing to move after the arm 4 has reached the limit of its extended or display position thereby preventing injury to or overstraining of the parts associated with the signal mechanism.

As hereinbefore stated the signal arm is normally hidden from view in the rear of the machine to which it is applied. However, when the brakes are set the signal arm 4 is thrown into horizontal or display position so as to be readily observed and thereby give warning to the driver of a vehicle in the rear to prevent rear end collision in the event of the advance vehicle slacking its speed or coming to a standstill. When the brakes are released the spring 6 comes into play to return the signal arm 4 into folded position.

What I claim is:

A vehicle signal comprising a mount, a signal arm pivoted adjacent its upper end to the mount and normally depending from the pivot in alignment with the mount and concealed thereby from one direction, the upper end of the mount having a stop in the upward path of the arm, said stop having a depending guard between which and the mount the arm is received and confined in its displayed position, a spring connected at opposite ends to the guard and to the upper portion of the arm to yieldably maintain the latter in its normal depending position, a stop provided upon the mount and against which the arm is normally held by the spring, a flexible operating connection secured to the upper portion of the arm, and a guide tube receiving the flexible connection.

ERNEST W. HOUSE.